United States Patent
Choi et al.

(10) Patent No.: US 7,158,390 B2
(45) Date of Patent: Jan. 2, 2007

(54) PHASE SHIFT FULL BRIDGE CONVERTER

(75) Inventors: Jae-Soon Choi, Seoul (KR); Dong-Hee Kim, Incheon (KR); Jae-Gon Seo, Gyeonggi-do (KR); Hong-Gyu Han, Gyeonggi-do (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 0 days.

(21) Appl. No.: 10/901,811

(22) Filed: Jul. 29, 2004
(Under 37 CFR 1.47)

(65) Prior Publication Data
US 2005/0128772 A1  Jun. 16, 2005

(30) Foreign Application Priority Data
Jul. 31, 2003 (KR) .............. 10-2003-0053106
May 19, 2004 (KR) .............. 10-2004-0035536

(51) Int. Cl.
*H02M 3/335* (2006.01)

(52) U.S. Cl. .......................... 363/17; 363/98
(58) Field of Classification Search .............. 363/17, 363/56.02, 98, 132
See application file for complete search history.

(56) References Cited

U.S. PATENT DOCUMENTS

| 6,396,722 B1 * | 5/2002 | Lin ............... 363/98 |
| 6,618,274 B1 * | 9/2003 | Boylan et al. ........ 363/17 |
| 6,804,129 B1 * | 10/2004 | Lin ............... 363/98 |

\* cited by examiner

*Primary Examiner*—Adolf Berhane
(74) *Attorney, Agent, or Firm*—Sidley Austin LLP (57) ABSTRACT

A converter is presented, including first and second switches coupled to an input power source to define a first conductive path, and third and fourth switches coupled to the input power source to define a second conductive path. A PWM unit turns on the switches in the order of the fourth, first, third, second, first, fourth, second, and third switches, and outputs pulse signals so that the first and fourth switches are turned on in overlapping intervals and the second and third switches are turned on in overlapping intervals.

17 Claims, 7 Drawing Sheets

PHASE SHIFT FULL BRIDGE CONVERTER

CROSS REFERENCE TO RELATED APPLICATION

This application claims priority to and the benefit of Korean Patent Application No. 2003-53106 filed on Jul. 31, 2003 and Korean Patent Application No. 2004-35536 filed on May 19, 2004 in the Korean Intellectual Property Office, the entire content of which is incorporated herein by reference.

BACKGROUND OF THE INVENTION

1. Field of the Invention

The present invention relates to inverters. More specifically, the present invention relates to inverters of a phase shift full-bridge type.

2. Description of the Related Art

Converters are power devices for converting DC and AC voltages. AC/DC converters convert an AC signal into a DC signal, DC/DC converters convert a DC signal into a DC signal, and inverters invert a DC signal into an AC signal. Inverters are used, for example, in switching mode power supplies (SMPS).

Figure 1:
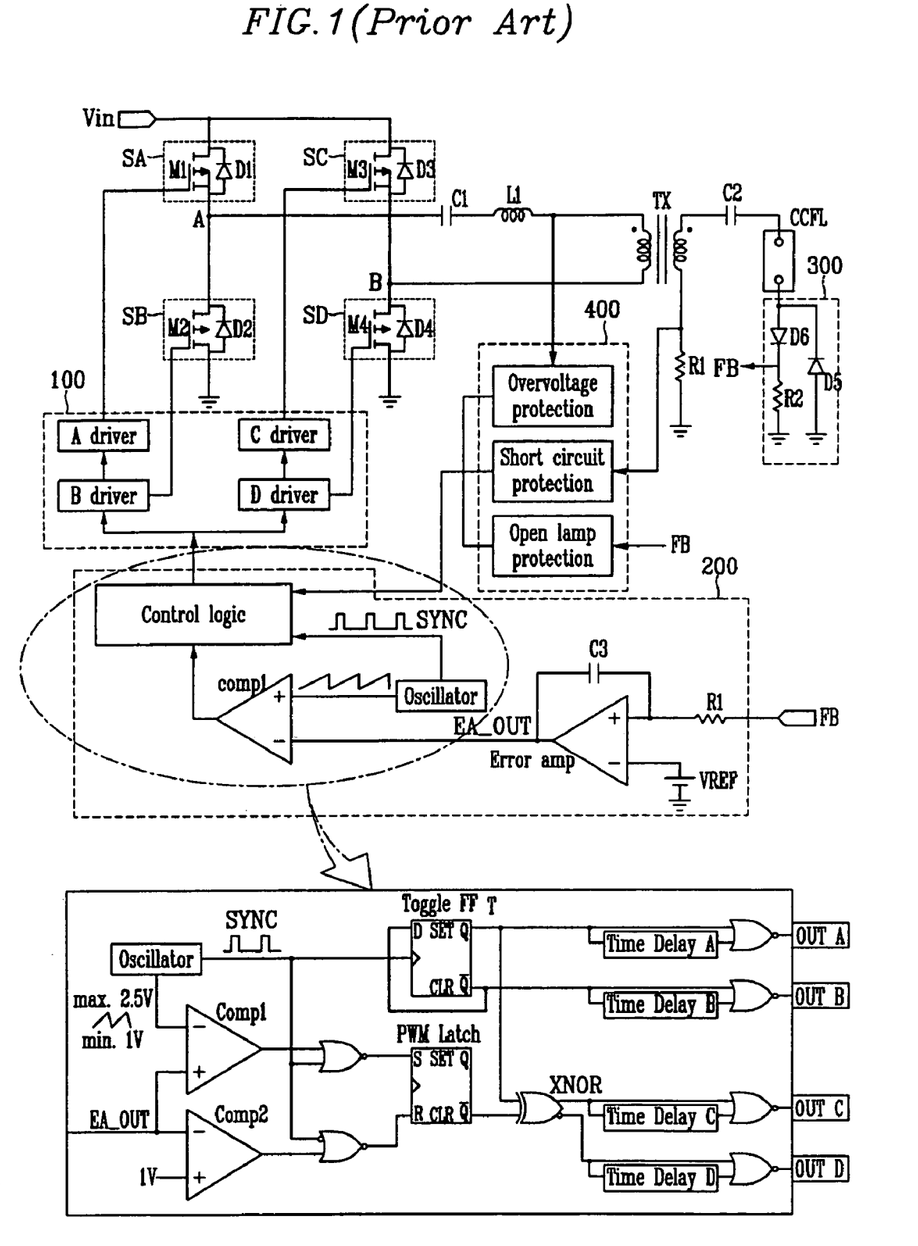
FIG. 1 shows a general full-bridge inverter.

FIG. 1 illustrates a general full-bridge inverter. The full-bridge inverter includes a power source providing input voltage Vin and four switches SA, SB, SC, and SD, diagonally coupled in pairs, for defining an AC conductive path. Further, the inverter includes a switch driver 100 containing four drivers for driving the respective switches, a PWM (pulse width modulation) unit 200 for generating pulse waveforms for driving the switch driver 100, a feedback unit 300, a protector 400, and a transformer TX. The inverter is coupled into a load CCFL.

Switches SA, SB, SC, and SD are turned on and off according to switching waveforms applied by PWM unit 200 and switch driver 100. The generated AC voltage is supplied to load CCFL through transformer TX.

PWM unit 200 comprises an oscillator, an error amplifier (Error Amp), a comparator (Comp1), and a control logic unit. The error amplifier receives a feedback signal from the feedback unit 300, and compares it with a reference voltage Vref, and the comparator compares an output of the error amplifier with a signal of the oscillator, and outputs result signals to the control logic unit. The control logic unit outputs for driving respective drivers of the switch driver 100, and comprises a toggle flip-flop (FF), a PWM latch, an XNOR gate, four OR gates, and delay circuits coupled to the OR gates.

In order to drive the inverter, switches SA, SB, SC, and SD are in some circuits turned on/off according to the phase shift full-bridge method.

Figure 2:
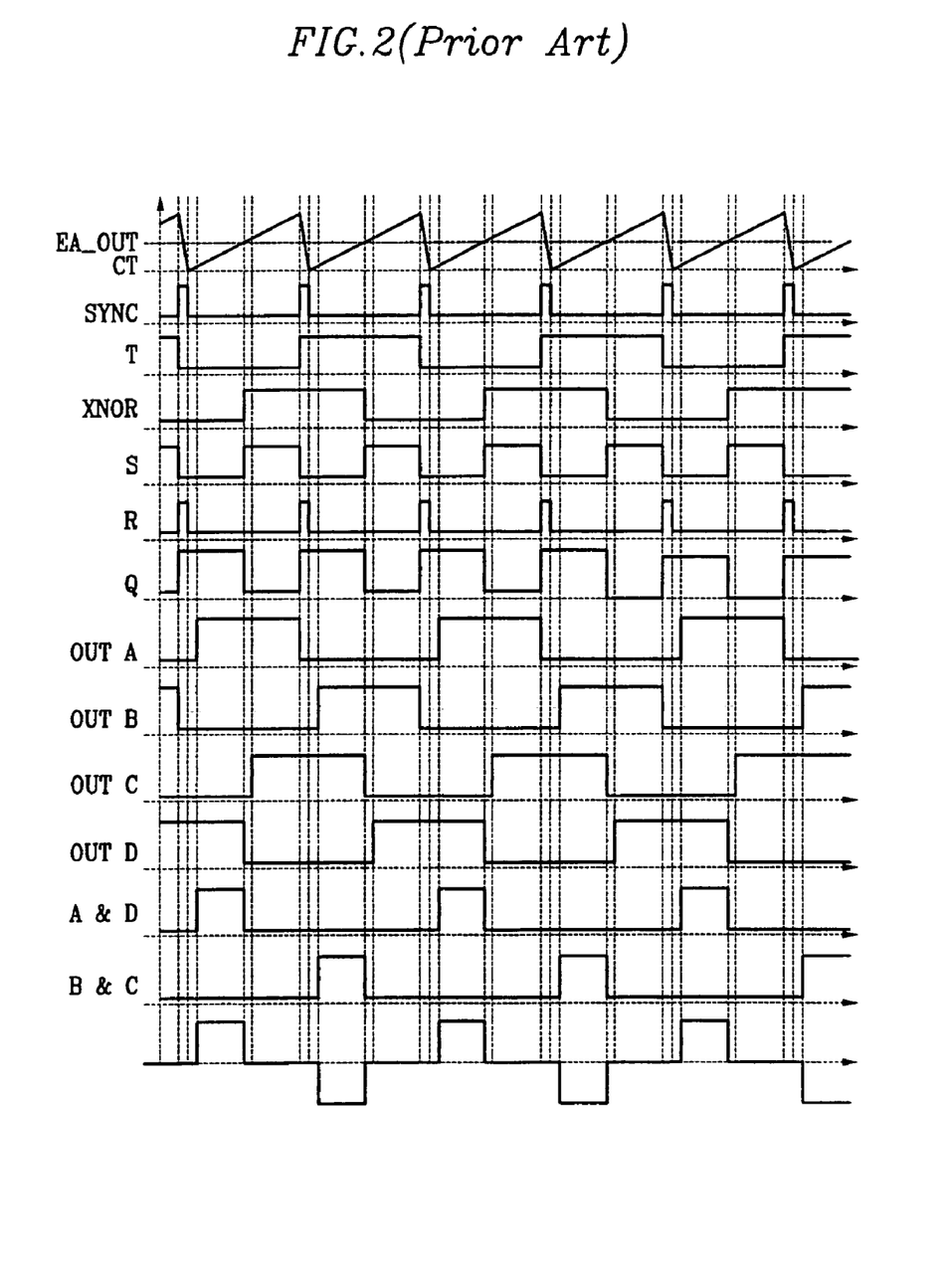
FIG. 2 shows waveforms of for driving the inverter by the phase shift full-bridge method of FIG. 1.

FIG. 2 shows waveforms for driving the inverter by the phase shift full-bridge method. Switches SA and SB are alternately turned on/off by signals OUT A and OUT B, which are generated according to waveforms of an oscillator. Switches SC and SD are turned on/off by signals OUT C and OUT D, which are phase shifted relative to signals OUT A and OUT B and are controlled by a reference signal EA_OUT. The phase shift can be a half period. When the switches SA and SB and the switches SC and SD are concurrently turned on, the circuit becomes shorted. To prevent this, a dead time is introduced between the switching of OUT A and OUT B, and of OUT C and OUT D, so that the signals are not in the high state at the same time.

The voltage at the primary of transformer TX is transmitted to the secondary only when the switches SA/SD and SB/SC are concurrently turned on, controlled by the signals OUT A, OUT B, OUT C, and OUT D.

Figure 3A:
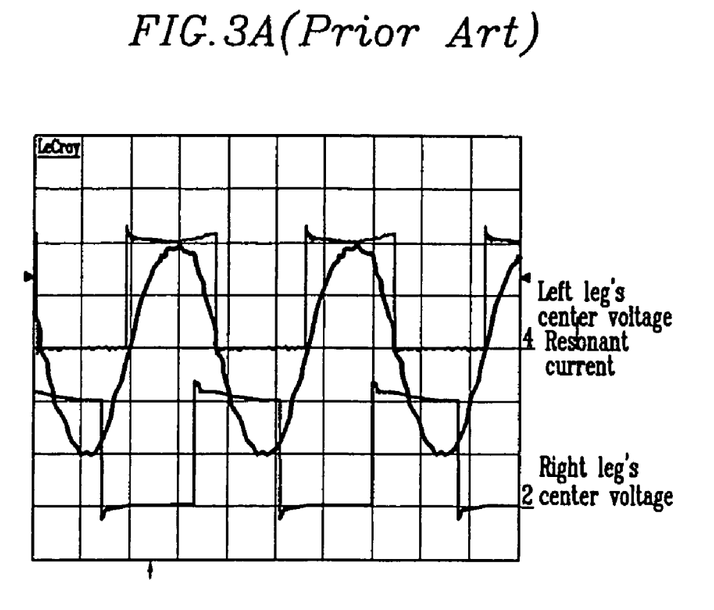
FIGS. 3A and 3B show waveforms of voltages at node A of the left leg and node B of the right leg, and waveforms of resonant currents of the LC resonance circuit C1 and L1, when the inverter is driven according to the conventional phase-shift full bridge method.
Figure 3B:
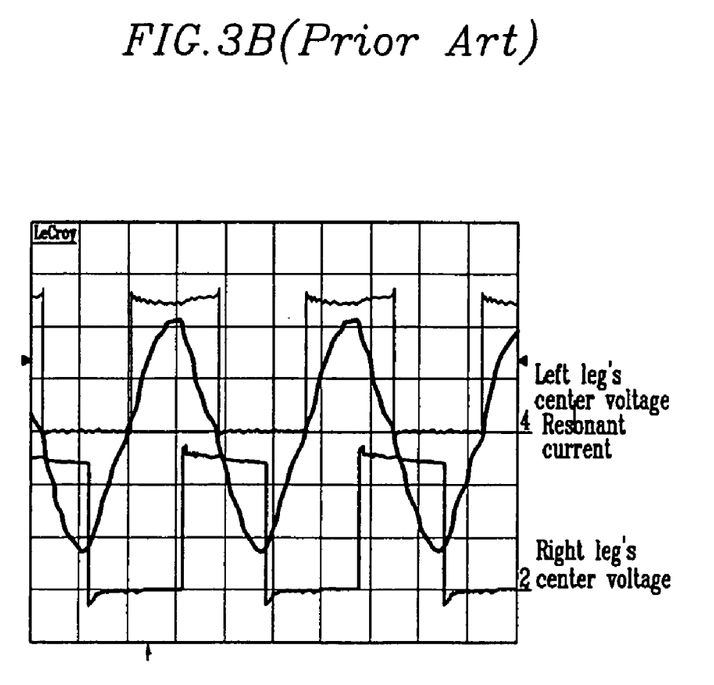

FIGS. 3A and 3B illustrate voltage-waveforms at point A of the left leg and point B of the right leg, and the resonant current of the LC resonance circuit C1 and L1, when the inverter is driven according to the conventional phase-shift full bridge method.

FIG. 3A shows a case of a large duty and FIG. 3B shows a case of a small duty. The term "duty" is used to describe the fraction of the cycle, when the load-voltage is on a high level. "Large duty" refers to waveforms, where the load-voltage is high for a large fraction of the cycle, "small duty" refers to waveforms with a small fraction.

For large duty the switches SA and SB in the left leg undergo zero voltage switching and the switches SC and SD in the right leg undergo zero voltage switching. But the switches SC and SD switch at higher currents than the switches SA and SB in the left leg, as shown in FIG. 3A.

When the duty is less, switches SA and SB in the left leg do not undergo zero voltage switching, but the switches SC and SD in the right leg undergo zero voltage switching. But the switches SC and SD switch at higher currents than the switches SA and SB in left leg, as shown in FIG. 3B.

Zero voltage switching provides an energy current path flowing to the secondary, when a switch is turned on after a diode coupled to a transistor is turned on. Zero voltage switching enhances the operational efficiency of MOSFETs.

Zero voltage switching reduces the operating temperature of MOSFETs. The temperature is substantially increased when no zero-current switching is performed since a large current flows to the MOSFET in the case of a low input voltage of Vin, and the temperature is substantially increased when no zero-voltage switching is performed since a high voltage is applied to the MOSFET in the case of a high input voltage of Vin.

In conventional inverters, for small duties, zero voltage switching isn't performed on the switches of the left leg and zero voltage switching is performed on the switches of the right leg. But the switches SC and SD switch at a higher current than the switches SA and SB in the left leg, as shown in FIG. 3B. Therefore, for low input voltages the switching efficiency of the right leg is low and thus the temperature of the MOSFETs of switches SC and SD becomes greater than the temperature of the MOSFETs of switches SA and SB. For high input voltages the switching efficiency of the left leg is low and the temperature of the MOSFETs of switches SA and SB becomes greater than the temperature of the MOSFETs of switches SC and SD.

SUMMARY OF THE INVENTION

Briefly and generally, switches of a converter form a left leg and a right leg in a full bridge format to alternately perform zero voltage switching and same current switching.

In one aspect of the present invention, a converter comprises: a first switch group including a first switch and a second switch coupled in series between an input power source and a ground power source; a second switch group including a third switch and a fourth switch coupled in series between the input power source and the ground power source; a transformer having a primary inductor coupled between a node of the first and second switches and a node of the third and fourth switches, and transmitting a power to the secondary according to a conductive path determined by the first to fourth switches; a load combined to the secondary of the transformer; a feedback circuit for outputting a signal corresponding to the power transmitted to the load; a PWM (pulse width modulation) unit for outputting pulse signals for driving the first to fourth switches based on the signal transmitted from the feedback circuit; and a switch driver for driving the first to fourth switches according to the pulse signals output by the PWM unit. The PWM unit outputs pulse signals for controlling turning on/off operation of the first to fourth switches so that the first switch group and the second switch group may alternately perform zero voltage switching and alternately switch at the same current.

In another aspect of the present invention, a converter comprises: a first switch group including first and second switches coupled in series between an input power source and a ground power source; a second switch group including third and fourth switches coupled in series between the input power source and the ground power source; a transformer having a primary inductor coupled between a node of the first and second switches and a node of the third and fourth switches, and transmitting a power to the secondary according to a conductive path determined by the first to fourth switches; a load combined to the secondary of the transformer; a feedback circuit for outputting a signal corresponding to the power transmitted to the load; a PWM (pulse width modulation) unit for outputting pulse signals for driving the first to fourth switches based on the signal transmitted from the feedback circuit; and a switch driver for driving the first to fourth switches according to the pulse signals output by the PWM unit. The PWM unit outputs pulse signals for forming a first conductive path so that a current in the first direction may flow to the primary inductor by turning on the first and fourth switches, forming a first discharge path so that the current in the first direction may flow to the primary inductor by turning on the first and third switches, forming a second conductive path so that a current in the second direction opposite the first direction may flow to the primary inductor by turning on the second and third switches, and forming a second discharge path so that the current in second first direction may flow to the primary inductor by turning on the first and third switches.

In still another aspect of the present invention, a converter comprises: a first switch group including first and second switches coupled in series between an input power source and a ground power source; a second switch group including third and fourth switches coupled in series between the input power source and the ground power source; a transformer for transmitting a power from the input power source to a secondary according to the conductive path determined by the first to fourth switches coupled to a primary; a load combined to the secondary of the transformer; a feedback circuit for outputting a signal corresponding to the power transmitted to the load; a PWM (pulse width modulation) unit for outputting pulse signals for driving the first to fourth switches based on the signal transmitted from the feedback circuit; and a switch driver for driving the first to fourth switches according to the pulse signals output by the PWM unit. The PWM unit outputs pulse signals so that intervals in which the first and fourth switches are turned on are superimposed with each other and intervals in which the second and third switches are turned on are superimposed with each other when turning on the switches in the order of the fourth, first, third, second, first, fourth, second, and third switches.

In still yet another aspect of the present invention, a method for controlling a converter including a first switch group including first and second switches coupled in series between an input power source and a ground power source; a second switch group including third and fourth switches coupled in series between the input power source and the ground power source; and a transformer having a primary inductor coupled between a node of the first and second switches and a node of the third and fourth switches, and transmitting a power to the secondary according to a conductive path determined by the first to fourth switches, comprises: (a) turning on the first and fourth switches to form a first conductive path so that a current in the first direction may flow to the primary inductor, when the input power is supplied; (b) turning on the first and third switches to form a first discharge path so that the current in the first direction may flow to the primary inductor; (c) turning on the second and third switches to form a second conductive path so that a current in the second direction opposite the first direction may flow to the primary inductor; and (d) turning on the first and third switches to form a second discharge path so that the current in the second direction may flow to the primary inductor.

In still further another aspect of the present invention, a converter control method comprises: (a) generating pulse signals for turning on first and fourth switches for determining a first conductive path, and second and third switches for determining a second conductive path, when an input power is supplied; (b) selectively turning on the first to fourth switches according to the pulse signal and transmitting the input power to the secondary of a transformer from the primary thereof through the one of the first and second conductive paths; (c) generating a feedback signal from a load coupled to the secondary of the transformer; and (d) controlling the pulse signals for turning on the first to fourth switches through the feedback signal, wherein (a) comprises outputting pulse signals so that intervals in which the first and fourth switches are turned on are superimposed with each other, and intervals in which the second and third switches are turned on are superimposed with each other, when turning on the switches in the order of the fourth, first, third, second, first, fourth, second, and third, switches.

BRIEF DESCRIPTION OF THE DRAWINGS

The accompanying drawings, which are incorporated in and constitute a part of the specification, illustrate embodiments of the invention, and, together with the description, serve to explain the principles of the invention.

DETAILED DESCRIPTION

In the following detailed description, embodiments of the invention are described simply by way of illustration. The invention includes modifications in various obvious respects, all without departing from the invention. Accordingly, the drawings and description are to be regarded as illustrative in nature, and not restrictive.

Figure 4:
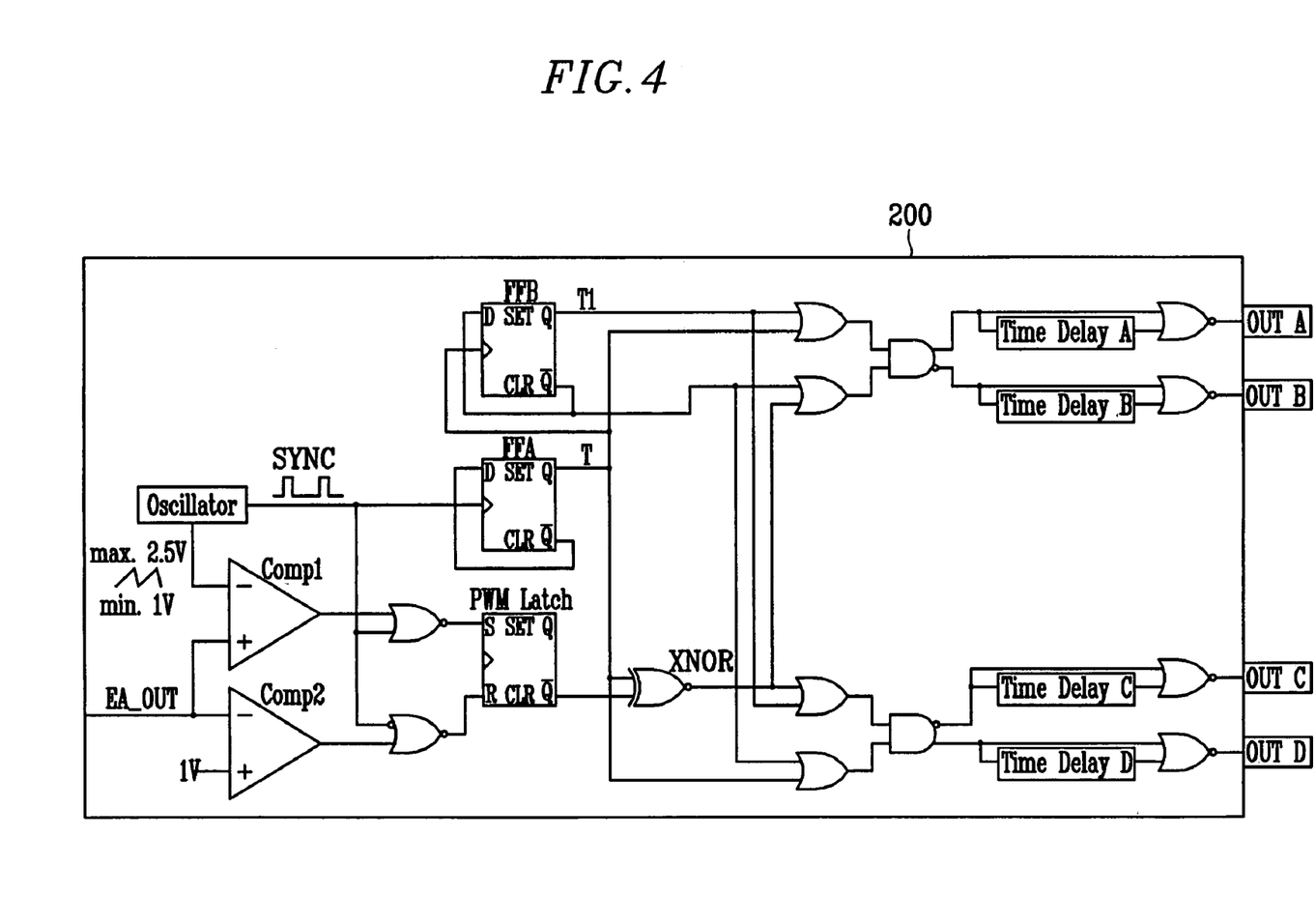
FIG. 4 shows a PWM unit of an inverter according to an embodiment of the present invention.

FIG. 4 illustrates an inverter according to an embodiment of the present invention. In addition to the elements already shown in FIG. 1, PWM unit 200 includes a toggle flip-flop FFB, four OR gates, and two AND gates. With these additions, the conventional driving waveforms of the switches SA and SD may cross, thus influencing the switching properties, and may be applied to drivers of the switches SA and SD. This feature of crossing waveforms makes possible to alternately perform zero voltage switching and switching at the same current.

When an output signal T of flip-flop FFA is input to a clock signal terminal of flip-flop FFB, and an OR operation and an AND operation are performed on output signal T of flip-flop FFA, the driving waveforms of switch SA and switch SD cross in each period.

Time delay elements A, B, C, and D, coupled to input ends of NOR gates at the respective output terminals, supply a dead time to respective output signals so that switches SA and SB and switches SC and SD may not be concurrently turned on.

The operation of the inverter according to embodiments of the invention will now be described in detail.

Figure 5:
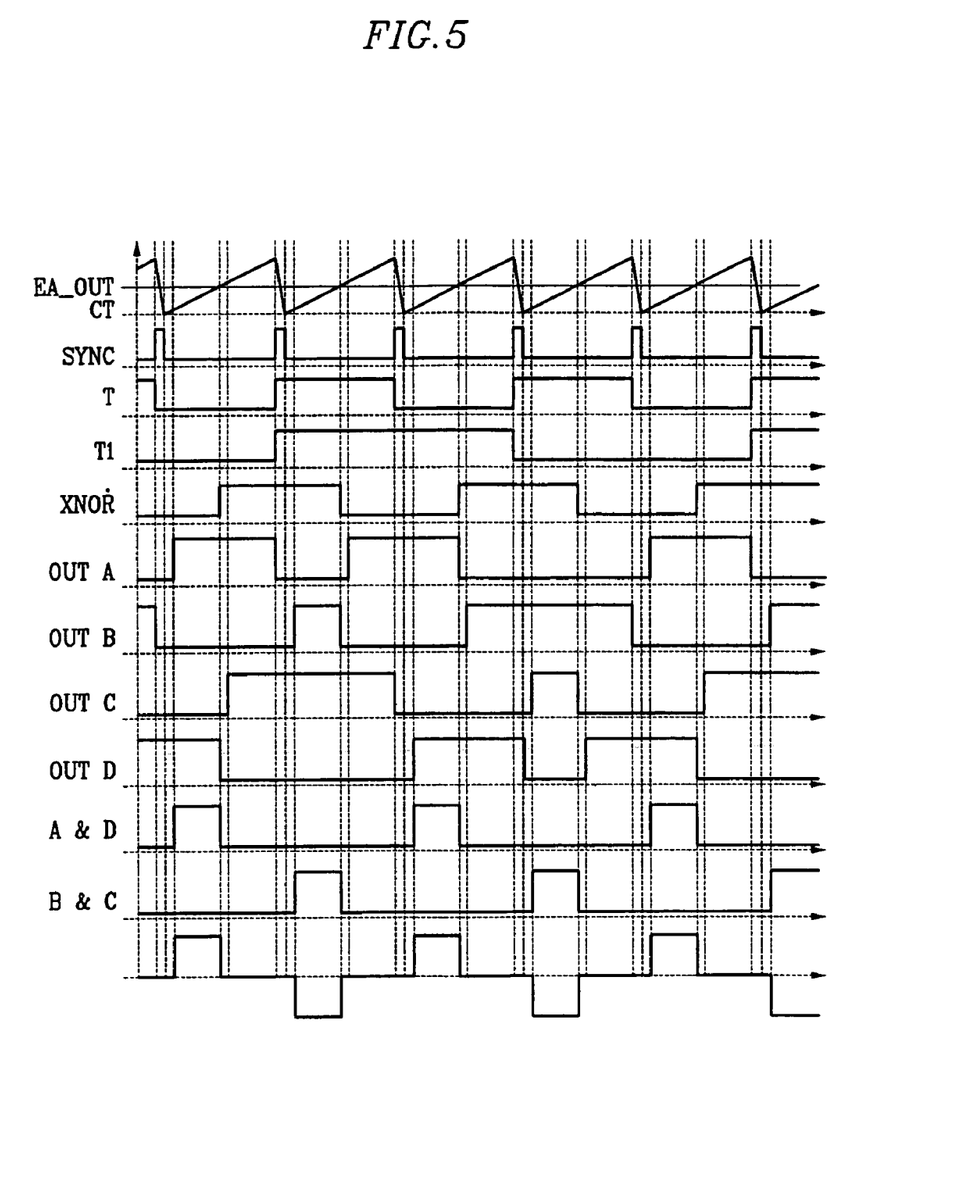
FIG. 5 shows waveforms output by respective components of a PWM unit of an inverter according to an embodiment of the present invention.

FIG. 5 shows driving waveforms output by the respective components of PWM unit 200 of the inverter according to an embodiment of the present invention.

Output signal T of flip-flop FFA determines the driving waveform of switch SA. Output signal T is toggled depending on a SYNC signal of the oscillator. An output signal T1 of flip-flop FFB is toggled depending on output signal T of flip-flop FFA. Therefore, the period of output signal T1 of flip-flop FFB is double of the period of output signal T of flip-flop FFA.

Further, an output signal XNOR of an exclusive NOR gate XNOR determines the driving waveform of switch SD. XNOR becomes high, when output signal T of flip-flop FFA corresponds to an output signal $\overline{Q}$ of a PWM latch.

Further, a driving waveform OUT A of switch SA is determined by an operation involving output signal T1 of flip-flop FFB, output signal T of flip-flop FFA, and output signal XNOR of the XNOR gate. The conventional driving waveform of switch SA is output when output signal T1 of flip-flop FFB is low, and the conventional driving waveform of switch SD is output, when output signal T1 of flip-flop FFB is high.

In a like manner, the driving waveform OUT D of switch SD is determined by an operation involving output signal T1 of flip-flop FFB, output signal T of flip-flop FFA, and output signal XNOR of the XNOR gate. The conventional driving waveform of switch SD is output, when output signal T1 of flip-flop FFB is low, and the conventional driving waveform of switch SA is output, when output signal T1 of flip-flop FFB is high.

In addition, the driving waveform OUT B of switch SB and the driving waveform OUT C of switch SC are inverted from the driving waveform OUT A of switch SA and the driving waveform OUT D of switch SD, respectively.

The waveforms A&D and B&C show the time intervals, when switches SA and SD, and SB and SC, respectively, are concurrently turned on. The final waveform indicates a voltage difference between nodes A and B.

According to the waveforms OUT A to OUT D of FIG. 5, switch SA is turned on while switch SD is turned on. Switches SA is turned off and SB is turned on while switch SC is turned on after switch SD is turned off. Also, when switch SB is turned off, switch SA is turned on, and switch SD is turned on after switch SC is turned off. When switches SA and SD and switches SB and SC are concurrently turned on as described, energy is supplied to capacitor C1, inductor L1, and transformer TX, and the voltage and the current resonate.

At the moment, when switch SC is turned off, current flows through diode D4, and switch SD is turned on after diode D4 is turned on. Also, switch SB is turned off, and current is switched to diode D1 combined with switch SA before switch SA is turned on. In a like manner, switch SD is turned off, current flows to the primary of the transformer TX and diode D3 through capacitor C1 from switch SA, and switch SC is turned on after diode D3 is turned on. Switch SB is turned on after switch SA for turning on diode D2 is turned off. The time, when switches SB and SC and switches SA and SD are concurrently turned on, determines the energy supplied to transformer TX. This time is determined by a level output by an error amplifier.

To generate an output with the appropriate level, the error amplifier compares a feedback signal FB to a reference voltage VREF. The feedback signal FB represents the magnitude of the current flowing through a sense resistor R2, and corresponds to the total current flowing through the load CCFL. The value of the feedback signal FB is varied depending on the load state and the Error amp output of the error amplifier varies accordingly. The reference voltage VREF is a voltage corresponding to a reference current flowing through the load. The reference voltage VREF corresponds to a mean value of the feedback signal FB in the normal operation.

Figure 6A:
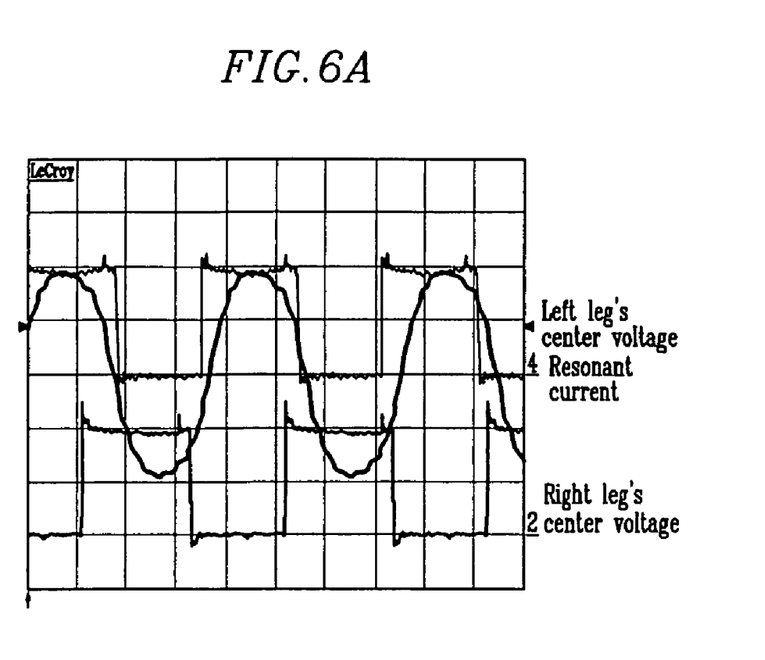
FIGS. 6A and 6B show voltages at node A of the left leg and node B of the right leg and waveforms of resonant currents of an LC resonance circuit C1 and L1 when the inverter is driven according to a preferred embodiment of the present invention.
Figure 6B:
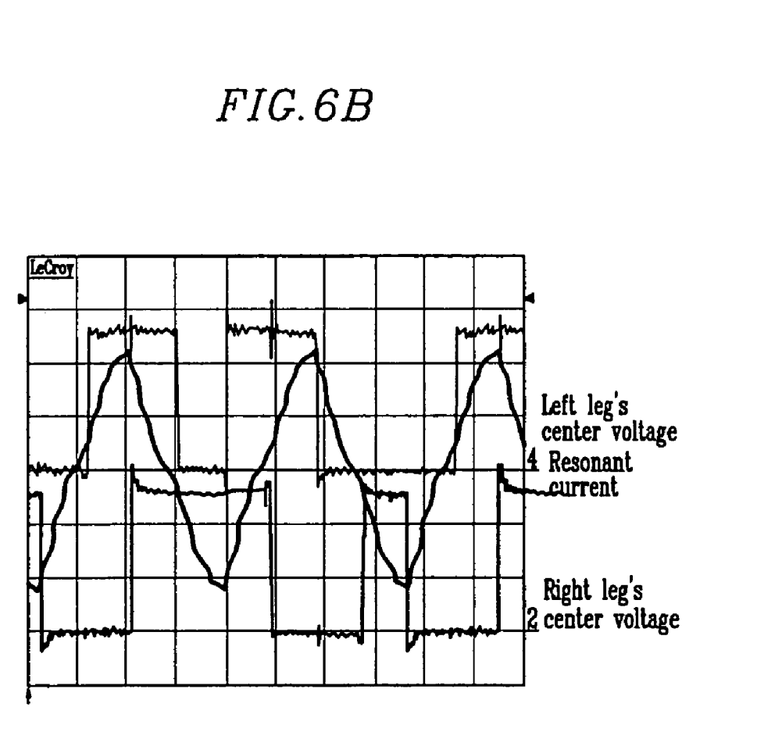

FIGS. 6A and 6B show waveforms of voltages at point A of the left leg and point B of the right leg and the waveform of the resonant current of LC resonance circuit C1 and L1 when the inverter is driven according to an embodiment of the present invention. FIG. 6A shows a case of a large duty and FIG. 6B shows a case of a smaller duty. As shown in FIG. 6A, zero voltage switching is performed at the switches, when the duty is large. Also, as shown in FIG. 6B, to alternately switch at zero voltage and at the same current are performed by switches SA and SB, and switches SC and SD, when the duty is small.

Up to now, DC to AC inverters have been described. Related embodiments of the invention include DC/DC converters for converting a DC voltage into another DC voltage.

Figure 7:
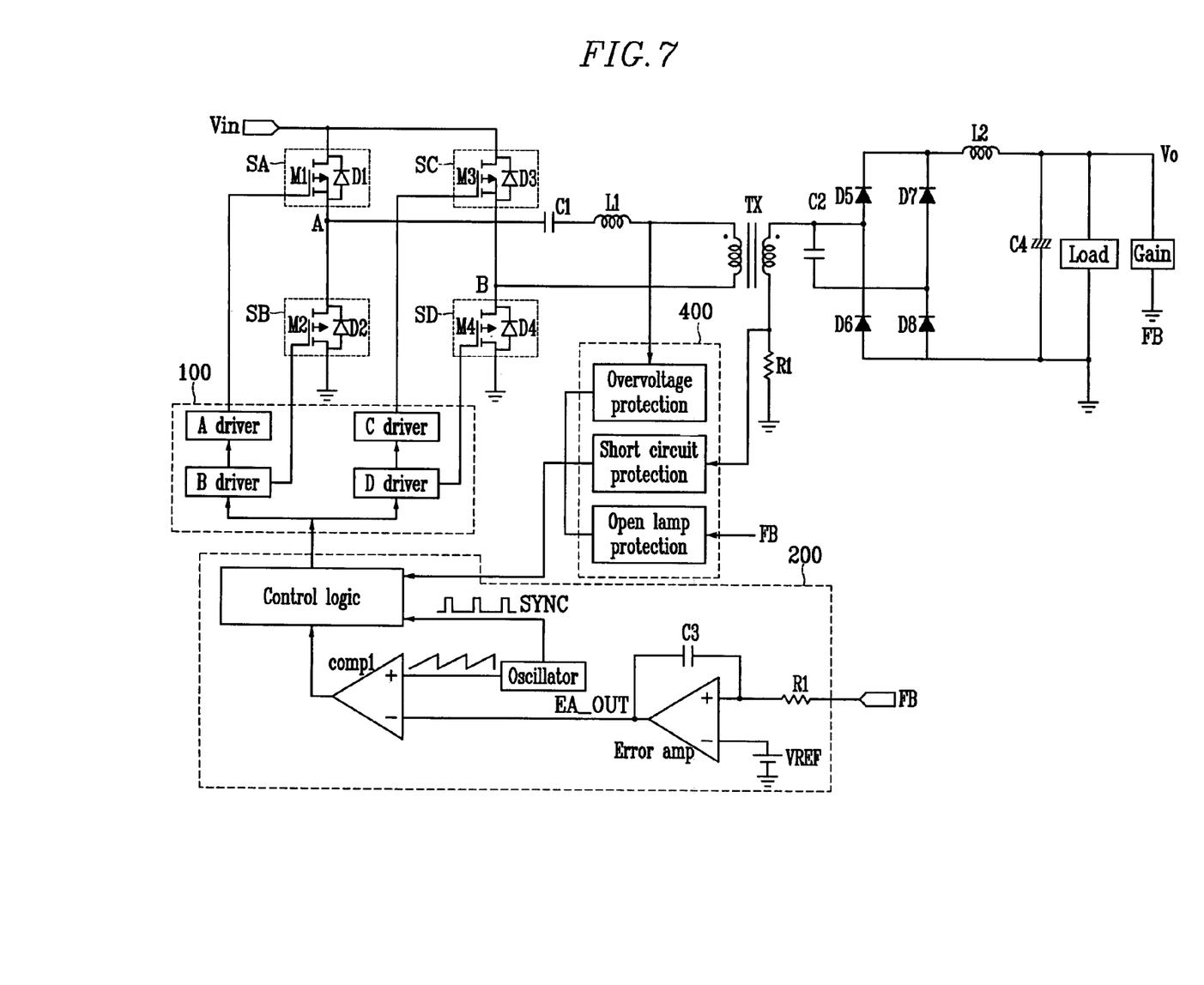
FIG. 7 illustrates an embodiment of the invention.

FIG. 7 shows a converter according to another embodiment of the present invention. As shown, the converter comprises bridge diodes D5, D6, D7, and D8 for rectifying the AC voltage transmitted from the transformer TX as a secondary circuit to generate the DC voltage. The rest of the configuration and operation of the primary circuit and the PWM unit 200 is analogous to the previously described embodiments.

While this invention has been described in connection with certain embodiments, it is to be understood that the invention is not limited to the disclosed embodiments, but, on the contrary, is intended to cover various modifications and equivalent arrangements included within the spirit and scope of the appended claims. For example, a lamp can used as the load CCFL, but other loads including a resistive load and a capacitive load can also be used.

The inverter alternately applies conventional waveforms for driving switches SA and SD in each period, and applies the inverted SA and SD driving waveforms to the drivers of switches SB and SC. These driving waveforms allow the switches of the left leg and the right leg alternately perform zero voltage switching and switch at the same current when the duty is less. Such embodiments avoid the temperature of one leg being higher than that of the other. Further, the switches can have greater on resistance compared to the prior art.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A converter comprising:
   a first switch group including a first switch and a second switch coupled in series between an input power source and a ground power source;
   a second switch group including a third switch and a fourth switch coupled in series between the input power source and the ground power source;
   a transformer having a primary inductor coupled between a node of the first and second switches and a node of the third and fourth switches, and transmitting a power to the secondary according to a conductive path determined by the first to fourth switches;
   a load combined to the secondary of the transformer;
   a feedback circuit for outputting a signal corresponding to the power transmitted to the load;
   a PWM (pulse width modulation) unit for outputting pulse signals for driving the first to fourth switches based on the signal transmitted from the feedback circuit; and
   a switch driver for driving the first to fourth switches according to the pulse signals output by the PWM unit,
   wherein the PWM unit is operable to output pulse signals for controlling turning on/off operation of the first to fourth switches so that the first switch group and the second switch group may alternately perform zero voltage switching and to switch at the same current.

2. The converter of claim 1, wherein the load is a lamp (CCFL), a resistive load, or a capacitive load.

3. A converter comprising:
   a first switch group including first and second switches coupled in series between an input power source and a ground power source;
   a second switch group including third and fourth switches coupled in series between the input power source and the ground power source;
   a transformer having a primary inductor coupled between a node of the first and second switches and a node of the third and fourth switches, and transmitting a power to the secondary according to a conductive path determined by the first to fourth switches;
   a load combined to the secondary of the transformer;
   a feedback circuit for outputting a signal corresponding to the power transmitted to the load;
   a PWM (pulse width modulation) unit for outputting pulse signals for driving the first to fourth switches based on the signal transmitted from the feedback circuit; and
   a switch driver for driving the first to fourth switches according to the pulse signals output by the PWM unit,
   wherein the PWM unit is operable to output pulse signals for forming a first conductive path so that a current in a first direction may flow to the primary inductor by turning on the first and fourth switches, forming a first discharge path so that the current in the first direction may flow to the primary inductor by turning on the first and third switches, forming a second conductive path so that a current in the second direction opposite the first direction may flow to the primary inductor by turning on the second and third switches, and forming a second discharge path so that the current in second first direction may flow to the primary inductor by turning on the first and third switches.

4. The converter of claim 3, wherein the PWM unit output pulse signals for forming the first conductive path by turning on the first and fourth switches, forming a third discharge path so that the current in the first direction may flow to the primary inductor by turning on the second and fourth switches, forming the second conductive path by turning on the second and third switches, and forming a fourth discharge path so that the current in the second direction may flow thereto by turning on the second and fourth switches.

5. The converter of claim 3, wherein the load is a lamp (CCFL), a resistive load, or a capacitive load.

6. A converter comprising:
   a first switch group including first and second switches coupled in series between an input power source and a ground power source;
   a second switch group including third and fourth switches coupled in series between the input power source and the ground power source;
   a transformer for transmitting a power from the input power source to a secondary according to the conductive path determined by the first to fourth switches coupled to a primary;
   a load combined to the secondary of the transformer;
   a feedback circuit for outputting a signal corresponding to the power transmitted to the load;
   a PWM (pulse width modulation) unit for outputting pulse signals for driving the first to fourth switches based on the signal transmitted from the feedback circuit; and
   a switch driver for driving the first to fourth switches according to the pulse signals output by the PWM unit,
   wherein the PWM unit is operable to output pulse signals so that intervals in which the first and fourth switches are turned on are superimposed with each other and intervals in which the second and third switches are turned on are superimposed with each other when turning on the switches in the order of the fourth, first, third, second, first, fourth, second, and third switches.

7. The converter of claim 6, wherein the pulse signals output by the PWM unit control such that the intervals in which the first and second switches are turned on may not be superimposed with each other and the intervals in which the third and fourth switches are turned on may not be superimposed with each other.

8. The converter of claim 7, wherein the switch driver controls to transmit the power of the input power source to the secondary of the transformer through a first conductive path formed by turning on the first and fourth switches through the pulse signal output by the PWM unit, and
   controls to transmit the power of the input power source to the secondary of the transformer through a second conductive path formed by turning on the second and third switches through the pulse signal output by the PWM unit.

9. The converter of claim 6, wherein the load is a lamp (CCFL), a resistive load, or a capacitive load.

10. A converter, comprising:
a first switch group including first and second switches coupled in series between an input power source and a ground power source;
a second switch group including third and fourth switches coupled in series between the input power source and the ground power source;
a transformer, configured to transmit the power to a secondary according to the conductive path determined by the first to fourth switches coupled to a primary;
a feedback circuit, configured to output a signal corresponding to the power transmitted to a load, coupled to the secondary of the transformer;
a PWM (pulse width modulation) unit, configured to output pulse signals for driving the first to fourth switches based on the signal transmitted from the feedback circuit; and
a switch driver, configured to drive the first to fourth switches according to the pulse signals output by the PWM unit,
wherein the PWM unit comprises:
a comparison unit including a first comparator configured to compare the signal transmitted by the feedback circuit with a predetermined reference signal and to output a signal corresponding to a difference value and a second comparator configured to compare an output of the first comparator with a sawtooth wave having a predetermined frequency and outputting a signal corresponding to a difference value;
a first flip-flop configured to use a pulse signal with the same frequency as that of the sawtooth wave and to generate a first pulse signal with a frequency half of that of the clock signal;
a second flip-flop including a logic gate configured to output a second pulse signal obtained by shifting the first pulse signal for a predetermined time according to the output signal of the second comparator; and
a logic operator circuit, configured to perform a logic operation on an output signal of the second flip-flop, the first pulse signal, and the second pulse signal, and to output the first and second pulse signals to drive the first and fourth switches.

11. The converter of claim 10, wherein the logic operator circuit is configured to output the second pulse signal to drive the fourth switch when the first pulse signal drives the first switch, and to output the first pulse signal to drive the fourth switch when the second pulse signal drives the first switch.

12. The converter of claim 10, wherein the logic operator circuit is configured to invert the driving pulse signal of the first switch and to apply the inverted signal as a driving pulse signal of the second switch, and inverts the driving pulse signal of the fourth switch to apply the inverted signal as a driving pulse signal of the third switch.

13. The converter of claim 10, wherein the load is a lamp CCFL, a resistive load, or a capacitive load.

14. A method for controlling a converter including a first switch group including first and second switches coupled in series between an input power source and a ground power source; a second switch group including third and fourth switches coupled in series between the input power source and the ground power source; and a transformer having a primary inductor coupled between a node of the first and second switches and a node of the third and fourth switches, and transmitting a power to the secondary according to a conductive path determined by the first to fourth switches, the method comprising:
(a) turning on the first and fourth switches to form a first conductive path so that a current in the first direction flows to the primary inductor, when the input power is supplied;
(b) turning on the first and third switches to form a first discharge path so that the current in the first direction flows to the primary inductor;
(c) turning on the second and third switches to form a second conductive path so that a current in the second direction opposite the first direction flows to the primary inductor; and
(d) turning on the first and third switches to form a second discharge path so that the current in the second direction flows to the primary inductor.

15. The method of claim 14, further comprising:
(e) turning on the first and fourth switches to form the first conductive path;
(f) turning on the second and fourth switches to form a third discharge path so that the current in the first direction flows to the primary inductor;
(g) turning on the second and third switches to form the second conductive path; and
(h) turning on the second and fourth switches to form a fourth discharge path so that the current in the second direction flows to the primary inductor.

16. A method for controlling a converter including a first switch group including first and second switches coupled in series between an input power source and a ground power source; a second switch group including third and fourth switches coupled in series between the input power source and the ground power source; and a transformer having a primary inductor coupled between a node of the first and second switches and a node of the third and fourth switches, and transmitting a power to the secondary according to a conductive path determined by the first to fourth switches, the method comprising:
(a) generating pulse signals for turning on first and fourth switches for defining a first conductive path, and second and third switches for defining a second conductive path, when an input power is supplied;
(b) selectively turning on the first to fourth switches according to the pulse signals and transmitting the input power to the secondary of a transformer from the primary thereof through the one of the first and second conductive paths;
(c) generating a feedback signal from a load coupled to the secondary of the transformer; and
(d) controlling the pulse signals for turning on the first to fourth switches through the feedback signal,
wherein (a) comprises:
turning on the first and fourth switches in overlapping intervals;
turning on the second and third switches in overlapping intervals; and
turning on sequentially the fourth, first, third, second, first, fourth, second, and third switches.

17. The converter control method of claim 16, wherein (a) comprises:
turning on the first and second switches in non-overlapping intervals; and
turning on the third and fourth switches in non-overlapping intervals.

* * * * *